United States Patent
Yamamoto et al.

(10) Patent No.: US 9,549,151 B2
(45) Date of Patent: Jan. 17, 2017

(54) VIDEO INTERCOM DEVICE

(71) Applicant: PANASONIC INTELLECTUAL PROPERTY MANAGEMENT CO., LTD., Osaka (JP)

(72) Inventors: Takashi Yamamoto, Fukuoka (JP); Shinji Fukuda, Fukuoka (JP); Ken Ohbuchi, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/989,912

(22) Filed: Jan. 7, 2016

(65) Prior Publication Data
US 2016/0323543 A1 Nov. 3, 2016

(30) Foreign Application Priority Data

Apr. 28, 2015 (JP) .................................. 2015-091673
Apr. 28, 2015 (JP) .................................. 2015-091678

(51) Int. Cl.
*H04N 7/18* (2006.01)
*H04N 7/14* (2006.01)

(52) U.S. Cl.
CPC .................................... *H04N 7/147* (2013.01)

(58) Field of Classification Search
CPC combination set(s) only.
See application file for complete search history.

(56) References Cited

U.S. PATENT DOCUMENTS

| 7,015,946 B2 * | 3/2006 | Suzuki | H04N 7/186 348/143 |
| 8,036,593 B2 * | 10/2011 | Watanabe | H04N 7/186 455/3.05 |

(Continued)

FOREIGN PATENT DOCUMENTS

| EP | 2602945 | 6/2013 |
| JP | 2006-135624 | 5/2006 |

(Continued)

OTHER PUBLICATIONS

U.S. Appl. No. 14/989,909 to Takashi Yamamoto et al., filed Jan. 7, 2016.

(Continued)

*Primary Examiner* — Joseph J Nguyen
*Assistant Examiner* — Phung-Hoang J Nguyen
(74) *Attorney, Agent, or Firm* — Greenblum & Bernstein, P.L.C.

(57) ABSTRACT

Provided is a video intercom device for suppressing electric power consumption. The video intercom device adopts a configuration where the video intercom device switches between a first communication method by which an indoor master unit or a telephone master unit and a front door slave unit performs wireless communication under a predetermined condition, and a second communication method with electric power consumption lower than that of the first communication method, the first communication method is switched to the second communication method when the indoor master unit registers the front door slave unit, and the second communication method is switched to the first communication method when a telephone master unit registers the front door slave unit.

12 Claims, 15 Drawing Sheets

(56) References Cited

U.S. PATENT DOCUMENTS

| | | | |
|---|---|---|---|
| 9,113,052 B1* | 8/2015 | Scalisi | H04N 7/186 |
| 2008/0136908 A1* | 6/2008 | Carter | H04M 11/025 |
| | | | 348/143 |
| 2013/0249288 A1* | 9/2013 | Haraguchi | H02J 7/35 |
| | | | 307/23 |
| 2016/0088552 A1 | 3/2016 | Hirai et al. | |
| 2016/0088553 A1 | 3/2016 | Hirai et al. | |
| 2016/0088561 A1 | 3/2016 | Hirai et al. | |

FOREIGN PATENT DOCUMENTS

| | | |
|---|---|---|
| JP | 2007-201874 | 8/2007 |
| JP | 2008-072292 | 3/2008 |
| JP | 2008-252271 | 10/2008 |
| JP | 2009-239517 | 10/2009 |

OTHER PUBLICATIONS

U.S. Appl. No. 15/001,592 to Kouichi Iida et al., filed Jan. 20, 2016.
The Extended European Search Report dated Sep. 9, 2016 for European Patent Application No. 15199638.6.

* cited by examiner

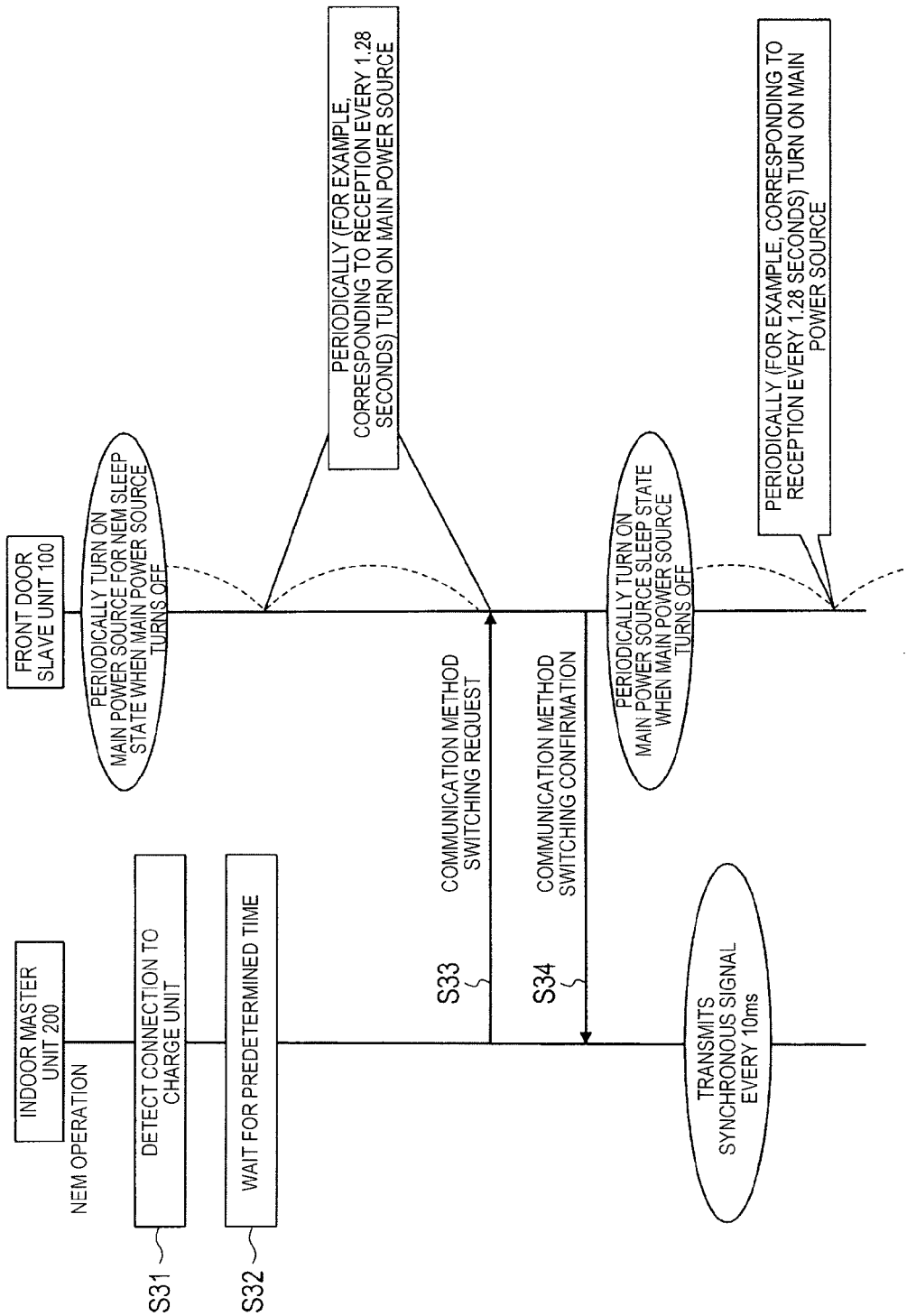

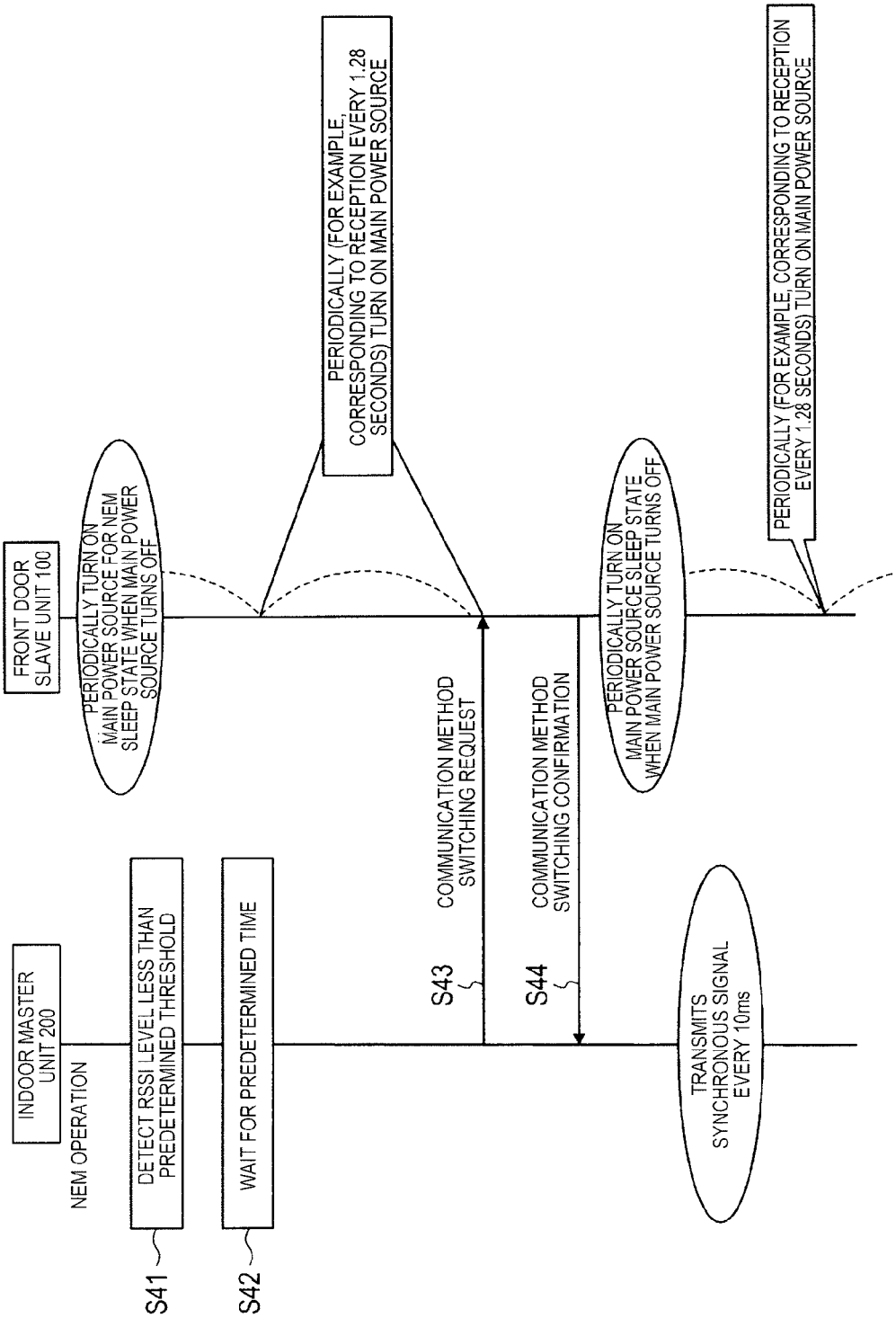

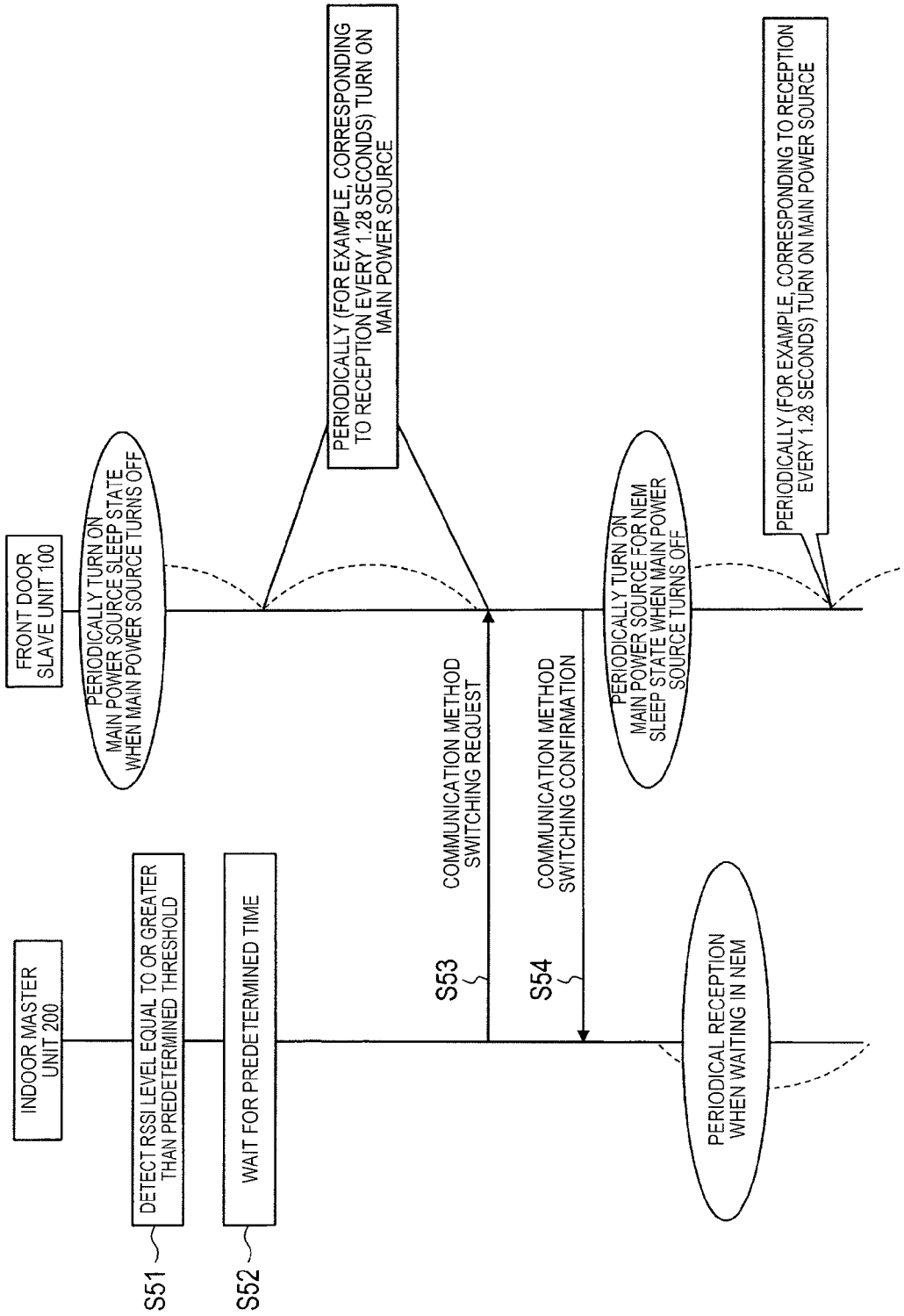

VIDEO INTERCOM DEVICE

BACKGROUND OF THE INVENTION

1. Field of the Invention

The present invention relates to a video intercom device.

2. Description of the Related Art

In recent years, awareness of crime prevention has increased year by year, and requests have increased to realize front door slave units or the like with low cost and easy installation in a single household of one-room apartments or the like as well as detached houses.

So as to meet the request of the easy installation at such a low cost, a technique where wiring work between devices is unnecessary using wireless communication is becoming popular. For example, in Japanese Patent Unexamined Publication No. 2008-252271, a television intercom device provided with a front door slave unit and a wireless master unit that wirelessly communicates with the front door slave unit is disclosed.

SUMMARY OF THE INVENTION

A video intercom device according to an aspect of the present disclosure adopts a configuration where the video intercom device switches between a first communication method and a second communication method with electric power consumption lower than that of the first communication method, by the first communication method, an indoor master unit or a telephone master unit wirelessly communicates with a front door slave unit, the indoor master unit or the telephone master unit periodically transmitting a synchronization signal at all times and periodically performing a reception operation, and the front door slave unit transmitting a request by turning on a main power source when necessary, receiving the synchronization signal by periodically turning on the main power source, and entering a sleep state when the main power source turns off, and by the second communication method, the indoor master unit which transmits a request by turning on the main power source only when necessary, receives signals by periodically turning on the main power source when waiting, and enters the sleep state when the main power source turns off, wirelessly communicates with the front door slave unit which transmits a request by turning on the main power source only when necessary, receives signals by periodically turning on the main power source when waiting, and enters the sleep state when the main power source turns off, the indoor master unit includes a wireless communication unit that requests for switching from the first communication method to the second communication method to the front door slave unit when registering the front door slave unit, the telephone master unit includes a wireless communication unit that requests for switching from the second communication method to the first communication method to the front door slave unit when registering the front door slave unit, and the front door slave unit includes a control unit that switches to a communication method requested from the indoor master unit or the telephone master unit.

In addition, the video intercom device according to the aspect of the present disclosure adopts a configuration where the video intercom device switches between the first communication method and the second communication method with electric power consumption lower than that of the first communication method, by the first communication method, the indoor master unit or the telephone master unit wirelessly communicates with the front door slave unit, the indoor master unit or the telephone master unit periodically transmitting a synchronization signal at all times and periodically performing a reception operation, and the front door slave unit transmitting a request by turning on a main power source when necessary, receiving the synchronization signal by periodically turning on the main power source, and entering a sleep state when the main power source turns off, and by the second communication method, the indoor master unit which transmits a request by turning on the main power source only when necessary, receives signals by periodically turning on the main power source when waiting, and enters the sleep state when the main power source turns off, wirelessly communicates with the front door slave unit which transmits a request by turning on the main power source only when necessary, receives signals by periodically turning on the main power source when waiting, and enters the sleep state when the main power source turns off, the indoor master unit includes a wireless communication unit that requests for switching from the second communication method to the first communication method to the front door slave unit when additional installation of a relay antenna between the indoor master unit and the front door slave unit is detected, and the front door slave unit includes a control unit that switches to a communication method requested from the indoor master unit or the telephone master unit.

According to the present disclosure, it is possible to suppress electric power consumption.

In addition, according to this disclosure, it is possible to adopt a new wireless communication method with low electric power consumption and to maintain compatibility with related devices such as a relay antenna.

BRIEF DESCRIPTION OF DRAWINGS

FIG. 13 is a sequence diagram illustrating a procedure for switching from the second communication method to the first communication method when the indoor master unit is connected to the charge unit;

FIG. 14 is a sequence diagram illustrating a procedure for switching from the second communication method to the first communication method when a communication environment between the front door slave unit and the indoor master unit is deteriorated according to a fourth exemplary embodiment; and FIG. 15 is a sequence diagram illustrating a procedure for switching from the first communication method to the second communication method when a communication environment between the front door slave unit and the indoor master unit is recovered.

DETAILED DESCRIPTION OF THE PREFERRED EMBODIMENTS

Before the description of the embodiment of the present invention, problems of the related art will be simply described. It is preferable to suppress electric power consumption so as to save the effort such as replacement of a battery or charging of the battery when a front door slave unit or a radio master unit is driven by the battery. In addition, there is also a case where it is needed to mount a new communication method for achieving low electric power consumption so as to suppress the electric power consumption. However, in this case, there is a problem that compatibility of wireless communication with related devices becomes incompatible. In particular, it is preferable that a relay antenna of the related devices can be connected so as to improve communication quality which can achieve a longer communication distance which is important in the wireless communication.

An object of the present invention is to provide a video intercom device suppressing electric power consumption, adopting a new wireless communication method with low electric power consumption, and maintaining compatibility with the related devices such as a relay antenna.

Hereinafter, embodiments of the present invention will be described in detail with reference to the drawings.

First Exemplary Embodiment

Figure 1:
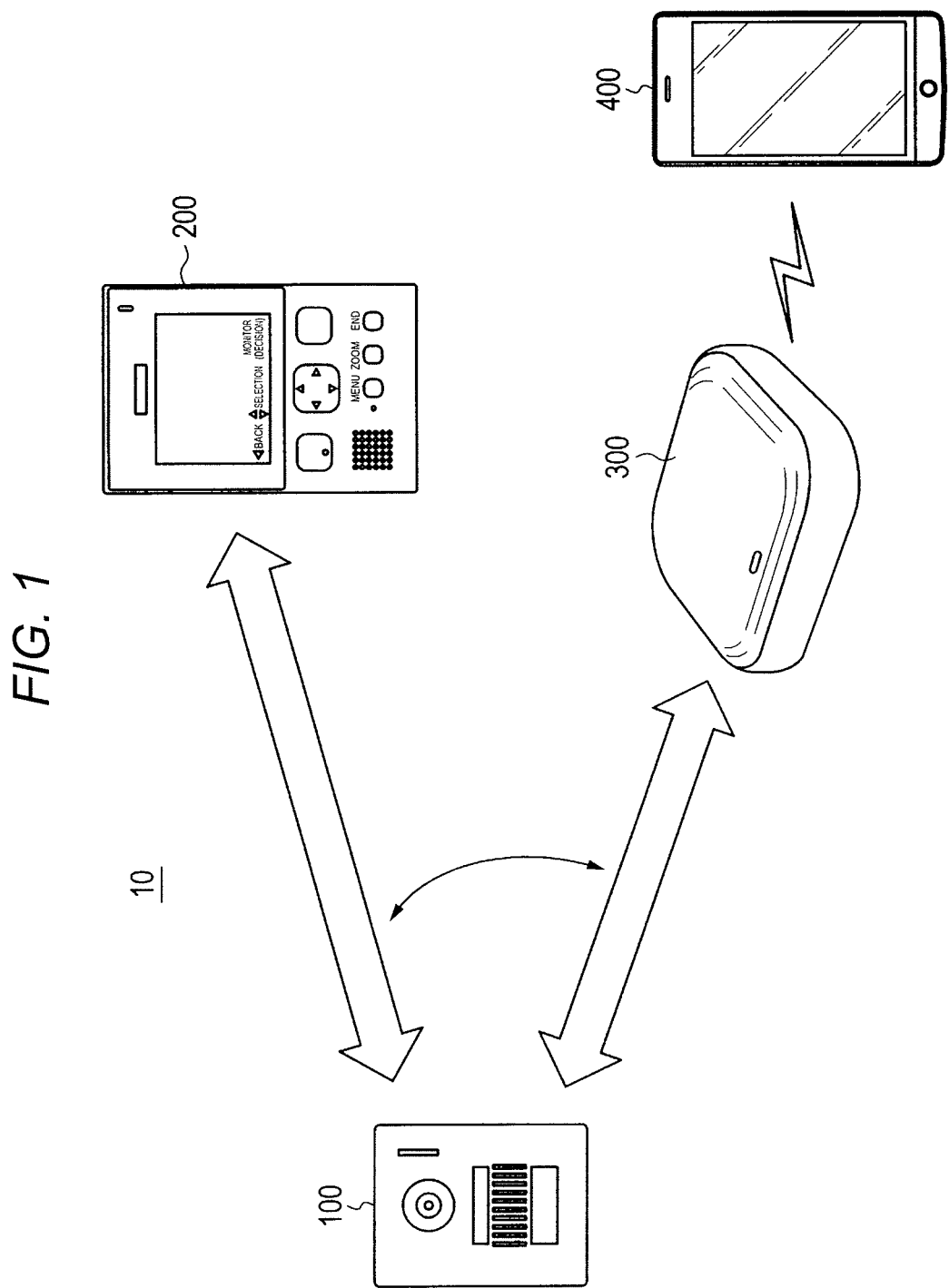
FIG. 1 is a diagram illustrating a video intercom device according to a first exemplary embodiment.

FIG. 1 is a diagram illustrating video intercom device 10 according to a first exemplary embodiment of the present invention. As illustrated in FIG. 1, video intercom device 10 includes front door slave unit 100, indoor master unit 200, telephone master unit (hereinafter, simply referred to as "master unit") 300, and smart phone 400. Video intercom device 10 can be switched between a case where front door slave unit 100 is wirelessly connected with indoor master unit 200 and a case where front door slave unit 100 is wirelessly connected with master unit 300. Master unit 300 can be wirelessly connected with smart phone 400.

Configuration of Front Door Slave Unit

Figure 2:
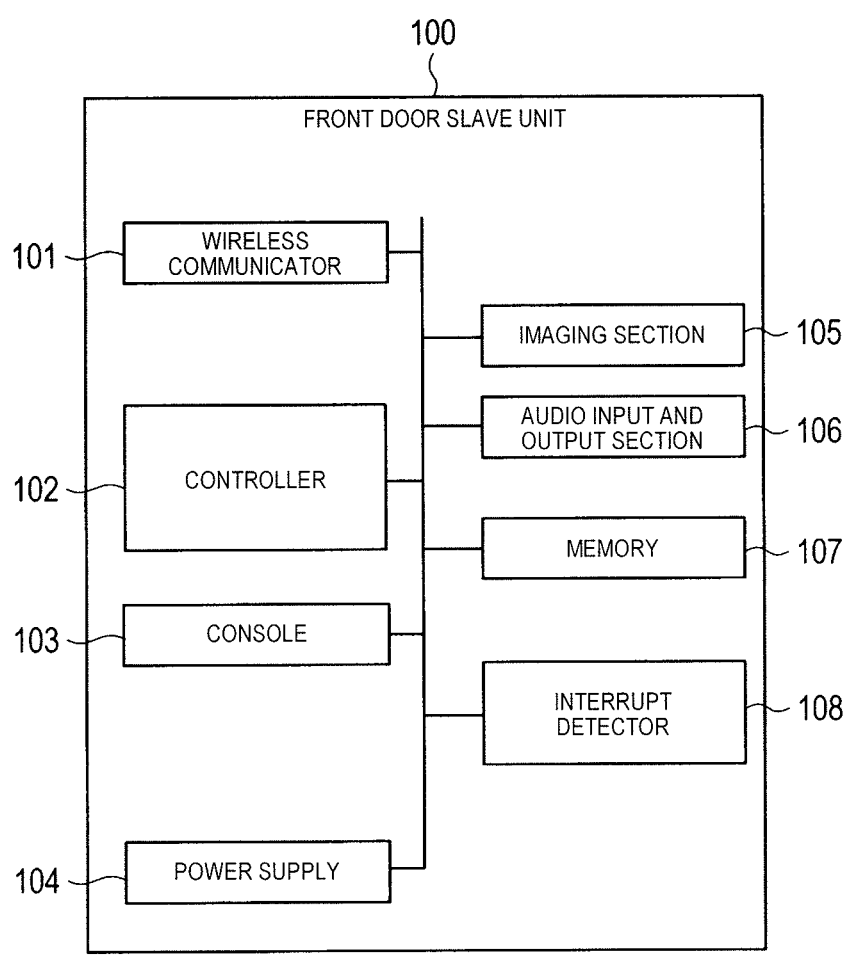
FIG. 2 is a block diagram illustrating a configuration example of a front door slave unit according to the first exemplary embodiment.

FIG. 2 is a block diagram illustrating a configuration example of front door slave unit 100 according to the first exemplary embodiment of the invention.

Front door slave unit 100 includes wireless communicator 101, controller 102, console 103, power supply 104, imaging section 105, audio input and output section 106, memory 107, and interrupt detector 108.

Wireless communicator 101 communicates with indoor master unit 200 or master unit 300 through a wireless channel. A communication method of wireless communicator 101, for example, includes Digital Enhanced Cordless Telecommunications (DECT), wireless local area network (LAN), and ZigBee (registered trademark).

Wireless communicator 101 transmits a captured image to indoor master unit 200 or master unit 300. With this, indoor residents can recognize the visitors present in the vicinity of the entrance door. In addition, wireless communicator 101 transmits voice information including voice of the visitors that is collected by audio input and output section 106 of front door slave unit 100 to indoor master unit 200 or master unit 300. In addition, wireless communicator 101 receives voice information including the voice of residents from indoor master unit 200 or master unit 300. With this, it is possible to make a phone call between an outdoor visitor and an indoor resident.

Controller 102 includes a read only memory (ROM), a random access memory (RAM), a central processing unit (CPU), or the like. For example, the CPU realizes various functions of controller 102 by executing a program stored in the ROM.

Controller 102 controls the entirety of front door slave unit 100, and performs various kinds of control, calculation, and determination. Controller 102 performs calculation processing for controlling each section of front door slave unit 100.

Console 103, for example, is a call button. The presence of the visitor is notified to indoor master unit 200 or master unit 300 through wireless communicator 101 when the call button is pressed by the visitors.

Power supply 104 provides electric power for driving front door slave unit 100 to respective sections. Power supply 104 is configured with batteries such as primary batteries, rechargeable batteries, or the like in view of the installation. However, power supply 104 is not limited thereto. The electric power may be input from an AC power source or an AC adapter.

Imaging section 105 captures a predetermined area in outdoor. Image (captured image) captured by imaging section 105, for example, includes video and still images, and the captured image includes image of visitors, passers, suspicious persons, objects other than a human, or the like.

Audio input and output section 106 is a microphone, a speaker, or the like, collects voice information including the sound of the visitors, and transmits information to indoor master unit 200 or master unit 300 through wireless communicator 101. In addition, audio input and output section 106 outputs voice information including the voice of residents which is transmitted from indoor master unit 200 or master unit 300.

Memory 107 is configured with a flash memory or the like, and for example stores device information of identification number or the like of front door slave unit 100, setting information, state information of indoor master unit 200 or master unit 300, a captured image before transmission to indoor master unit 200 or master unit 300, or the like.

Interrupt detector 108 detects a key interrupt caused from a button or the like of front door slave unit 100, an interrupt caused from a timer, and an interrupt caused from various events. The detection of the interrupt includes detection of an interrupt caused from a hardware or a software.

Interrupt detector 108 has also a function for controlling electric power supply to each section by power supply 104 so as to realize ultra low electric power consumption. For example, interrupt detector 108 is disposed between respective sections such as power supply 104, controller 102, or the like, on circuits and only interrupt detector 108 is driven by weak electric power from power supply 104 at all times. Accordingly, interrupt detector 108 turns on or off a switching element for supplying electric power to each section based on the detection of a predetermined interrupt.

Configuration of Indoor Master Unit

Figure 3:
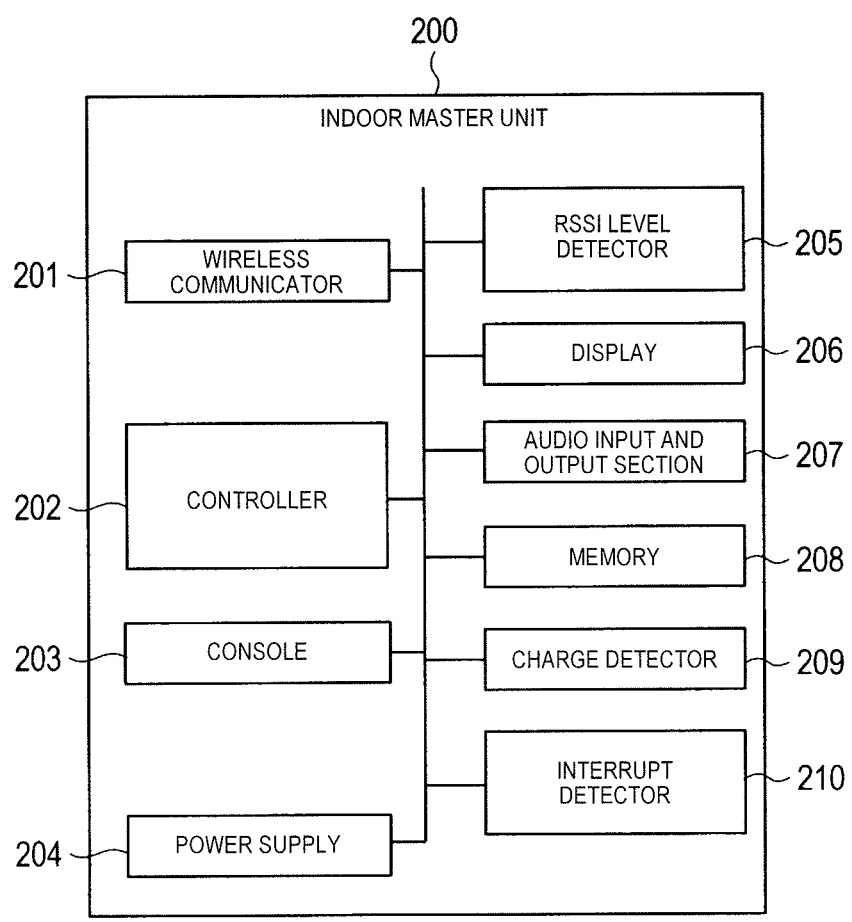
FIG. 3 is a block diagram illustrating a configuration example of an indoor master unit according to the first exemplary embodiment.

FIG. 3 is a block diagram illustrating a configuration example of indoor master unit 200 according to the first exemplary embodiment of the invention.

Indoor master unit 200 includes wireless communicator 201, controller 202, console 203, power supply 204, RSSI level detector 205, display 206, audio input and output section 207, memory 208, charge detector 209, and interrupt detector 210.

Wireless communicator 201 communicates with front door slave unit 100 through a radio channel. A communication method of wireless communicator 201, for example, includes DECT, wireless LAN, or ZigBee (registered trademark).

Wireless communicator 201 receives a captured image from front door slave unit 100. With this, indoor residents can recognize the visitors present in the vicinity of the entrance door. In addition, wireless communicator 201 receives voice information including the voice of the visitors from front door slave unit 100. In addition, wireless communicator 201 transmits voice information including voice of the residents that is collected by audio input and output section 207 of indoor master unit 200 to front door slave unit 100. With this, it is possible to make a phone call between an outdoor visitor and an indoor resident.

Controller 202 includes ROM, RAM, CPU, or the like. For example, the CPU realizes various functions of controller 202 by executing a program stored in the ROM. Controller 202 controls the entirety of indoor master unit 200, and performs various kinds of control, calculation, and determination. Controller 202 performs calculation processing for controlling each section of indoor master unit 200.

Console 203 includes various buttons such as a response button for responding to a case where the presence of the visitor is notified from front door slave unit 100, a monitor button for acquiring a captured image from front door slave unit 100, a button for controlling front door slave unit 100, or the like.

Power supply 204 supplies electric power for driving indoor master unit 200 to respective sections. Power supply 204 may be applied as a case where the electric power from an AC power source or an AC adapter is input and a case where the power supply is configured with batteries such as primary batteries, rechargeable batteries, or the like in view of the installation.

RSSI level detector 205 detects strength, that is, a received signal strength indicator (RSSI) level of a signal that is received from front door slave unit 100 to wireless communicator 201.

Display 206, for example, includes a liquid crystal display (LCD), and displays various characters or images. The images, for example, include video and still images, a captured image from front door slave unit 100, and images for operating indoor master unit 200.

Audio input and output section 207 is a microphone, a speaker, or the like, collects voice information including the sound of the residents, and transmits information to front door slave unit 100 through wireless communicator 201. In addition, audio input and output section 207 outputs voice information including the voice of residents which is transmitted from front door slave unit 100.

Memory 208 is configured with a flash memory or the like, for example, and includes various images or audio, and other management information. The images, for example, include video and still images, captured images from front door slave unit 100, and images for operating indoor master unit 200. The audio, for example, includes audio of a fixed form message generated from indoor master unit 200.

The other management information, for example, includes password information so as to not arbitrarily change various setting information of indoor master unit 200.

Charge detector 209 detects whether or not indoor master unit 200 is connected to a charge unit such as a charging stand or the like, and power supply 204 is connected to an external power source.

Interrupt detector 210 detects a key interrupt caused from a button or the like of indoor master unit 200, an interrupt caused from a timer, and an interrupt caused from various events. The detection of the interrupt includes detection of an interrupt caused from a hardware or a software.

Interrupt detector 210 has also a function for controlling electric power supply to each section by power supply 204 so as to realize ultra low electric power consumption. For example, interrupt detector 210 is disposed between respective sections such as power supply 204, controller 202, or the like, on circuits and only interrupt detector 210 is driven by weak electric power from power supply 204 at all times. Accordingly, interrupt detector 210 turns on or off a switching element for supplying the electric power to each section based on the detection of a predetermined interrupt.

Configuration of Master Unit

Figure 4:
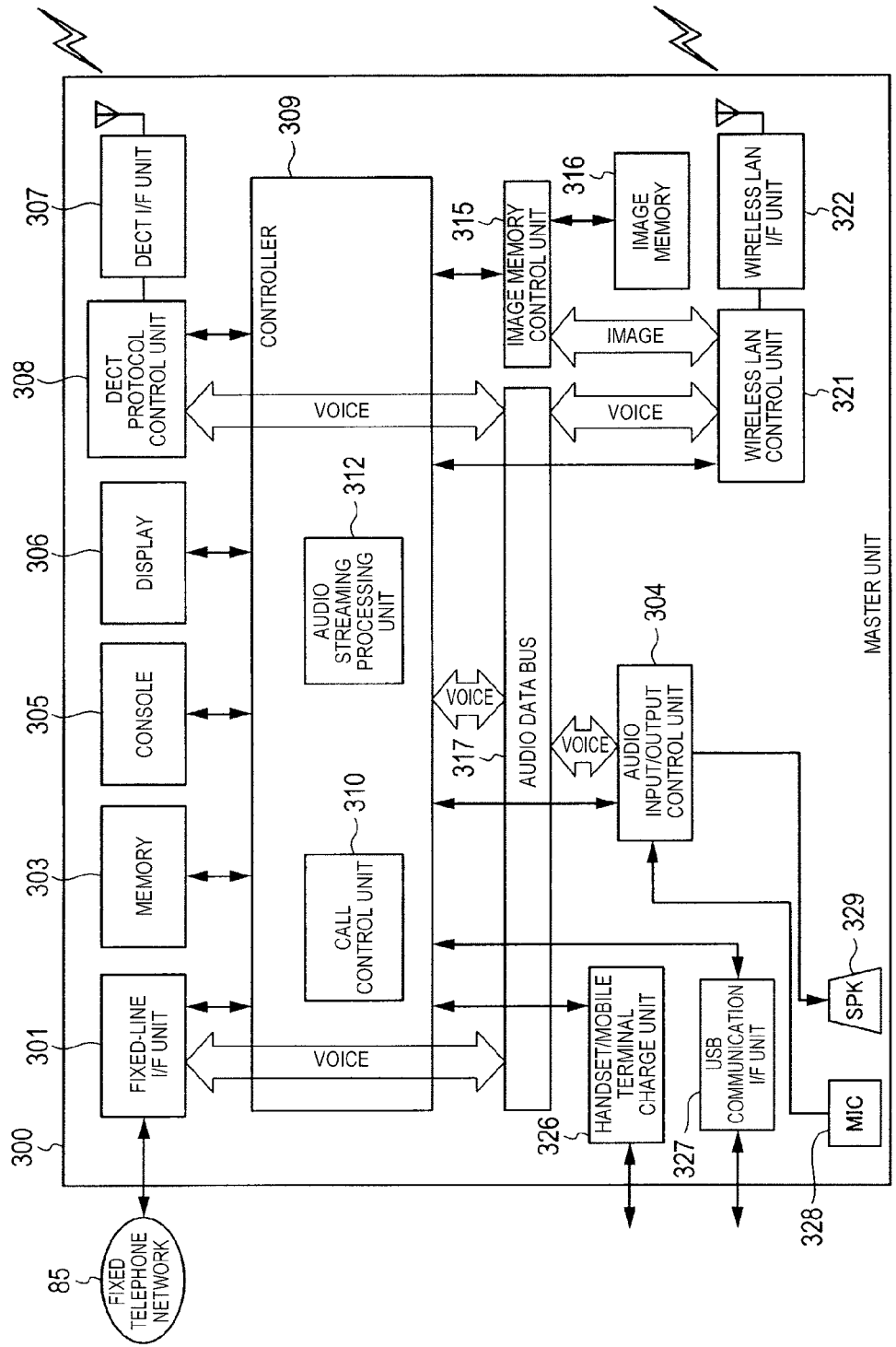
FIG. 4 is a block diagram illustrating a configuration example of a master unit according to the first exemplary embodiment.

FIG. 4 is a block diagram illustrating a configuration example of master unit 300 according to the first exemplary embodiment of the invention.

Fixed-line I/F unit 301 is connected to fixed telephone network 85. With this, master unit 300 can call up an external fixed telephone that is connected to fixed telephone network 85.

Audio input/output control unit 304 is connected to audio data bus 317, and controls microphone 328 and speaker 329. Microphone 328 collects voice information including a voice of residents, and transmits the information to front door slave unit 100 through DECT protocol control unit 308 and DECT I/F unit 307. Speaker 329 outputs voice information including a voice of visitors that is transmitted from front door slave unit 100.

Console 305 includes various buttons or a touch panel, for example, a dial button, a function button, a speed button, a hold button, or the like.

Display 306, for example, includes a liquid crystal display (LCD), and displays various characters or images. The images, for example, include video and still images, a captured image from front door slave unit 100.

DECT protocol control unit 308 performs wireless connection with front door slave unit 100 and a telephone slave unit (not shown) through DECT I/F unit 307 using the DECT wireless method.

Controller 309 controls the entirety of master unit 300, and performs various kinds of control, calculation, and determination. In addition, Controller 309 includes call control unit 310 and audio stream processing unit 312, call control unit 310 performs control of a phone call, and audio stream processing unit 312 performs audio data processing or the like.

Image memory control unit 315 controls image memory 316, and stores image data or the like which is captured in front door slave unit 100 in image memory 316.

Wireless LAN control unit 321 transmits or receives image data and audio data to or from smart phone 400 through a wireless router that is connected with wireless LAN I/F unit 322 using wireless LAN.

Handset/mobile terminal charge unit 326 includes an outlet or a connection plug, and charges the telephone slave unit or smart phone 400 that is connected to the outlet or the connection plug.

USB communication I/F unit 327 transmits and receives data by being connected to a device, a memory, or the like having an interface of the universal serial bus (USB) standard.

In addition, master unit 300 registers smart phone 400 and a wireless router in advance.

Configuration of Smart Phone

Figure 5:
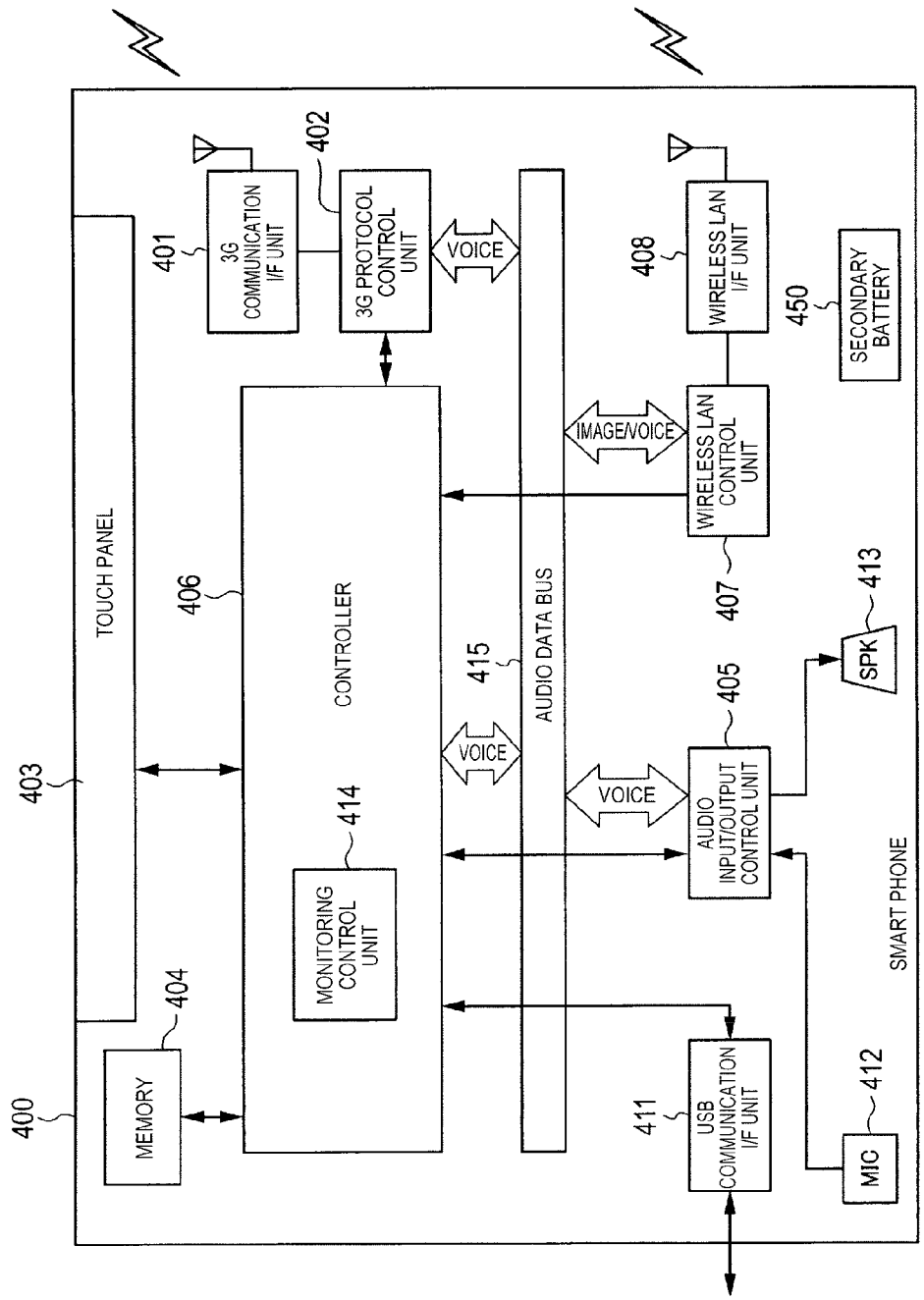
FIG. 5 is a block diagram illustrating a configuration example of a smart phone according to the first exemplary embodiment.

FIG. 5 is a block diagram illustrating a configuration example of smart phone 400 according to the first exemplary embodiment of the invention.

3G protocol control unit 402 performs wireless connection with a mobile phone or another smart phone that is connected to a mobile phone network through 3G communication I/F unit 401 using the 3G (the third generation) wireless communication technology.

Touch panel 403 is a display input unit in which a display and a console are integrated, displays information such as an image, an icon, or the like on a screen, and receives a tap operation (or touch operation) of the screen by a user.

Memory 404 is configured with a flash memory or the like, and stores various images, audio, other management information, or the like. The images, for example, include video and still images, a captured image from front door slave unit 100, and images for operating smart phone 400. The audio, for example, includes audio of a fixed form message generated from smart phone 400.

Audio input/output control unit 405 is connected to audio data bus 415, and controls microphone 412 and speaker 413. Microphone 412 collects voice information including audio, and transmits the voice information to front door slave unit 100 through wireless LAN control unit 407 and wireless LAN I/F unit 408. Speaker 413 outputs voice information including a voice of visitors that is transmitted from front door slave unit 100.

Controller 406 includes a ROM, a RAM, a CPU, or the like. For example, the CPU realizes various functions of controller 406 by executing a program stored in the ROM. Controller 406 controls the entirety of smart phone 400, and performs various kinds of control, calculation, and determination. In addition, controller 406 embeds monitoring control unit 414 capable of setting a function of front door slave unit 100 therein.

Wireless LAN control unit 407 transmits or receives image data and audio data to or from master unit 300 or the like through a wireless router that is connected with wireless LAN I/F unit 408 using a wireless LAN.

USB communication I/F unit 411 transmits and receives data by being connected to a device, a memory, or the like having an interface of the universal serial bus (USB) standard.

Secondary battery 450 is a battery to be charged, and supplies electric power to each unit of smart phone 400.

Communication Method

Next, a communication method of video intercom device 10 described above will be described.

The first communication method is a method by which indoor master unit 200 or master unit 300 wirelessly communicates with front door slave unit 100. Indoor master unit 200 or master unit 300 periodically transmits a synchronization signal at all times and periodically performs a reception operation. Front door slave unit 100 transmits a request by turning on a main power source when necessary, receives the synchronization signal by periodically turning on the main power source, and enters a sleep state when the main power source turns off. The sleep state of front door slave unit 100 is a state where only a minimum circuit block for turning on the main power source is biased with ultra low current consumption when the main power source turns off. It is considered that a call button of front door slave unit 100 is pressed according to the necessity of front door slave unit 100. In addition, front door slave unit 100 may transmit a request by turning on the main power source only when necessary, and may enter the sleep state when the main power source turns off.

The second communication method is a method by which indoor master unit 200 wirelessly communicates with front door slave unit 100. Indoor master unit 200 transmits a request by turning on the main power source only when necessary, receives signals by periodically turning on the main power source when waiting, and enters the sleep state when the main power source turns off. Front door slave unit 100 transmits a request by turning on the main power source when necessary, and receives signals by periodically turning on the main power source when waiting, and enters the sleep state when the main power source turns off. In addition, front door slave unit 100 may transmit a request by turning on the main power source only when necessary, and may enter the sleep state when the main power source turns off. In addition, indoor master unit 200 may transmit the synchronization signal with a longer interval than a reception interval of front door slave unit 100, and front door slave unit 100 may receive the synchronization signal with the longer interval by periodically turning on the main power source, and may enter the sleep state when the main power source turns off. In order to apply a communication method where a no emission mode (NEM) is used in which the synchronous signal and all other signals are not transmitted when waiting, or the synchronization signal with a longer interval than a reception interval of front door slave unit 100 is transmitted by turning on the main power source only when necessary, since the second communication method can reduce electric power consumption of a transmission operation that uses large electric power consumption compared to the first communication method, it is possible to suppress electric power consumption.

Switching of Communication Method

Figure 6:
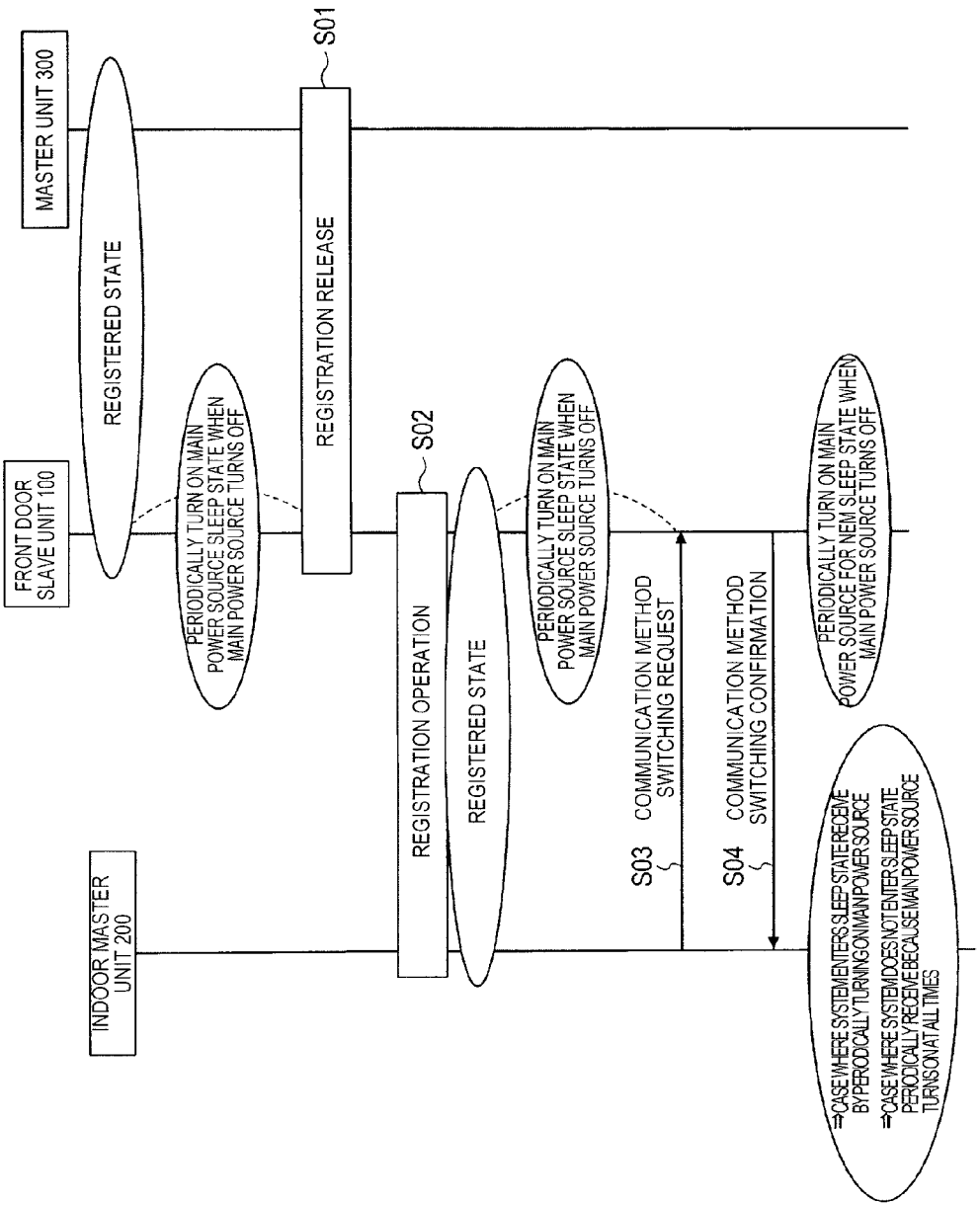
FIG. 6 is a sequence diagram illustrating a procedure for switching from a first communication method to a second communication method when the indoor master unit registers the front door slave unit.

FIG. 6 is a sequence diagram illustrating a procedure for switching from the first communication method to the second communication method when indoor master unit 200 registers front door slave unit 100. Here, first, it is assumed to use the first communication method in a state (registered state) where first master unit 300 has registered front door slave unit 100.

In step S01, master unit 300 releases the registration of front door slave unit 100, and in step S02, indoor master unit 200 enters a registered state by performing an operation (registration operation) for registering front door slave unit 100. In this case, it is assumed that front door slave unit 100 and indoor master unit 200 use the first communication method.

In step S03, indoor master unit 200 transmits a communication switching request for switching to the second communication method to front door slave unit 100, and in step S04, front door slave unit 100 transmits a switching confirmation for the second communication method to indoor master unit 200 and is switched to the second communication method.

With this, indoor master unit 200 receives signals by periodically turning on the main power source when the system of the embodiment enters the sleep state, and periodically receives signals because the main power source turns on at all times when the system does not enter the sleep state. In addition, front door slave unit 100 periodically turns on the main power source for the NEM, and enters the sleep state when the main power source turns off.

Figure 7:
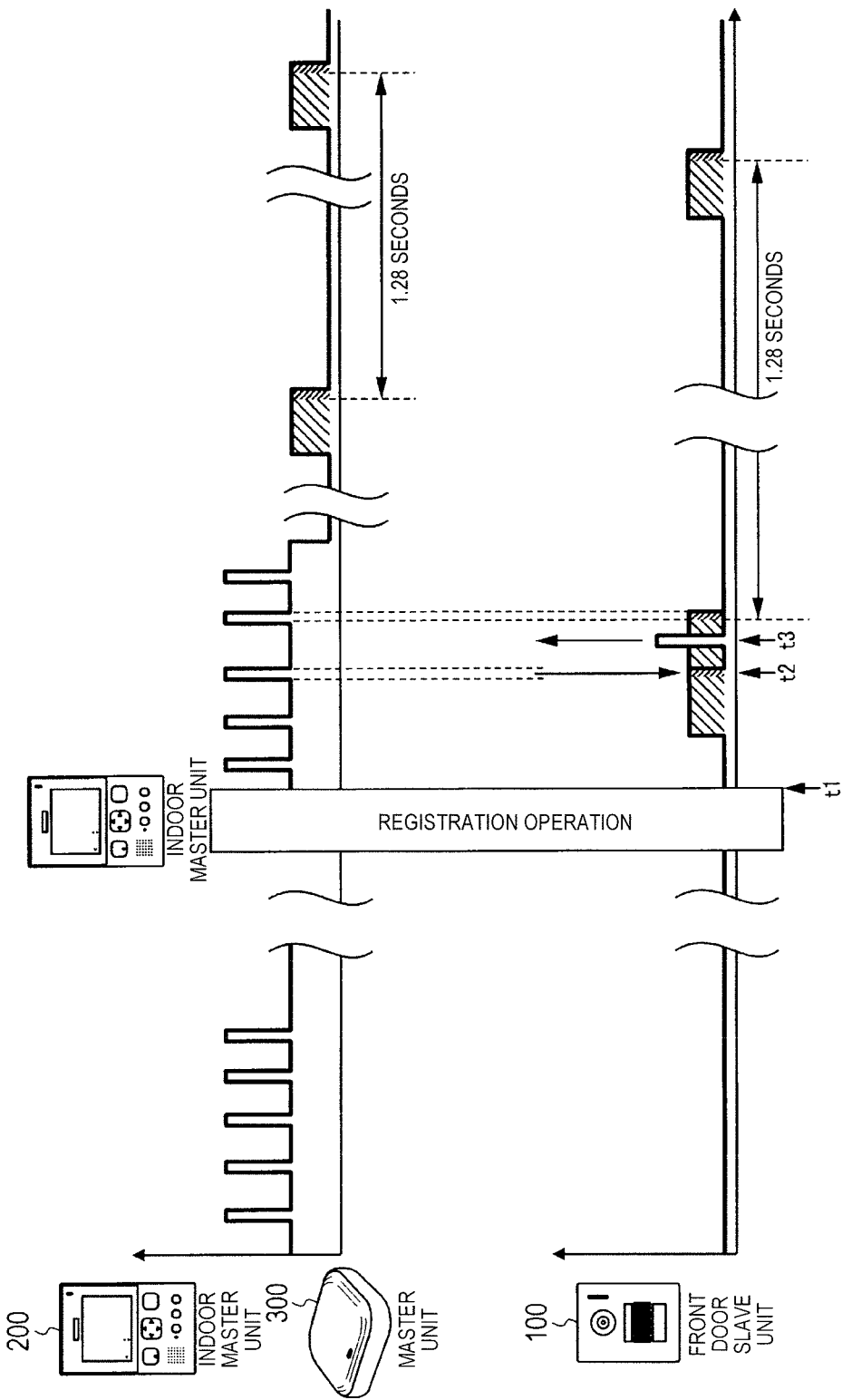
FIG. 7 is a diagram illustrating a state of change of current consumption in the front door slave unit and the indoor master unit or the master unit.

FIG. 7 is a diagram illustrating a state of change of current consumption in front door slave unit 100 and indoor master unit 200 or master unit 300. This figure illustrates a case where master unit 300 releases the registration of front door slave unit 100, indoor master unit 200 performs a registration operation of front door slave unit. 100 when master unit 300, and front door slave unit 100 are set in the first communication method.

Indoor master unit 200 performs a registration operation of front door slave unit 100 at time t1, and indoor master unit 200 transmits a switching request for the second communication method at time t2 and front door slave unit 100 receives the switching request at a timing where the main power source turns on.

At time t3, front door slave unit 100 transmits a communication method switching confirmation to indoor master unit 200 and is switched to the second communication method. In addition, it is assumed that indoor master unit 200 enters the sleep state where the main power source turns off. With this, it is possible to significantly reduce a bias current when the main power source turns off.

Figure 8:
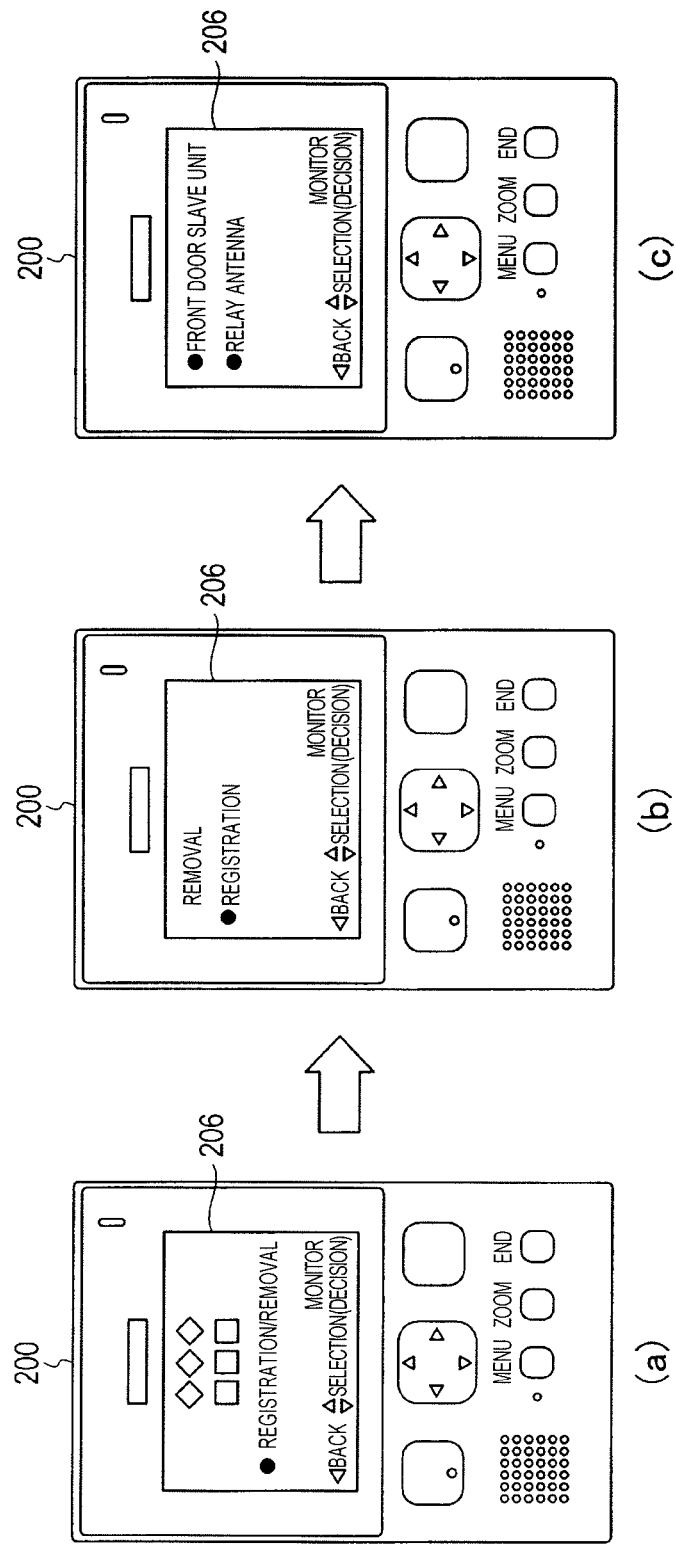
FIG. 8 shows diagrams illustrating an example of a setting screen of the indoor master unit.

FIG. 8 shows diagrams illustrating an example of a setting screen of indoor master unit 200. The resident presses a menu button or a selection button, selects "registration/removal" that is displayed on display 206 as illustrated in (a) in FIG. 8, and decides an item by pressing a decision button.

The resident presses a selection button, selects "registration" that is displayed on display 206 as illustrated in (b) in FIG. 8, and decides an item by pressing the decision button.

The resident presses a selection button, selects "front door slave unit" that is displayed on display 206 as illustrated in (c) in FIG. 8, and decides the front door slave unit by pressing the decision button. In addition, a setting illustrated in FIG. 8 can be performed in the same manner even in smart phone 400.

In this way, video intercom device 10 according to the first exemplary embodiment periodically transmits a synchronous signal at all times and is switched from the first communication method to the second communication method when indoor master unit 200 registers front door slave unit 100. The first communication method is a method by which indoor master unit 200 or master unit 300 that periodically performs a reception operation is synchronized with front door slave unit 100 that transmits a request by turning on the main power source when necessary, receives the synchronous signal by periodically turning on the main power source, and enters the sleep state when the main power source turns off. The second communication method is a method by which indoor master unit 200 wirelessly communicates with front door slave unit 100. Indoor master unit 200, for example, transmits a request by turning on the main power source only when necessary, receives signals by periodically turning on the main power source when waiting, and enters the sleep state when the main power source turns off. Front door slave unit 100 transmits a request by turning on the main power source when necessary, receives signals by periodically turning on the main power source when waiting, and enters the sleep state when the main power source turns off. With this, it is possible to suppress electric power consumption of indoor master unit 200.

In addition, in the present embodiment it is described that indoor master unit 200 is switched from the first communication method to the second communication method when registering front door slave unit 100. However, the present invention is not limited thereto. For example, telephone master unit 300 may be switched from the second communication method to the first communication method when registering front door slave unit 100.

Second Exemplary Embodiment

In a second exemplary embodiment of the present invention, a case where a relay antenna additionally installed between both of indoor master unit 200 and front door slave unit 100 will be described in a state where indoor master unit 200 registers front door slave unit 100.

Since a configuration of front door slave unit 100 and indoor master unit 200 according to the second exemplary embodiment is the same as FIGS. 2 and 3 of the first exemplary embodiment, the description is incorporated to these figures, and the overlap will be omitted, if necessary.

Figure 9:
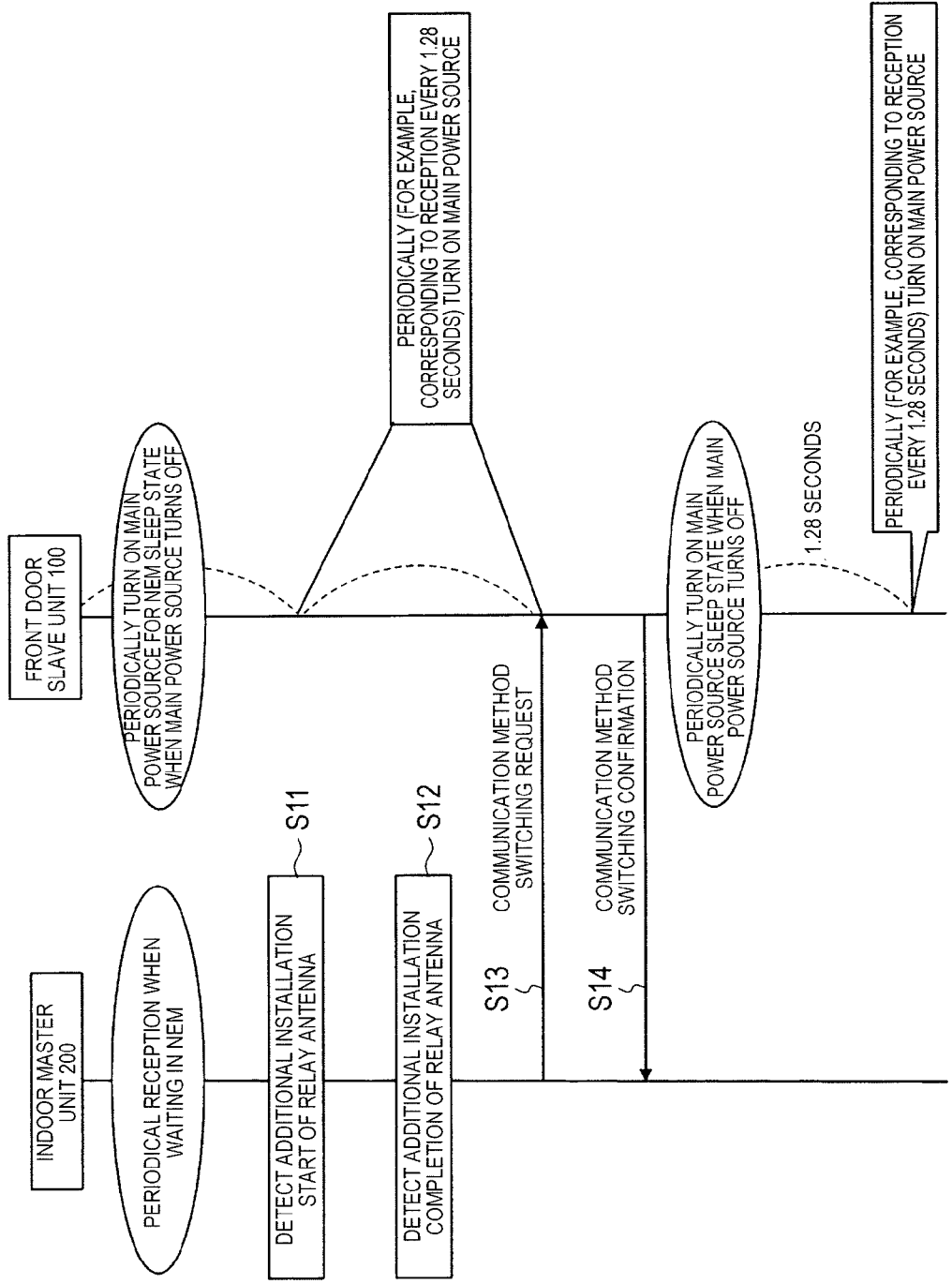
FIG. 9 is a sequence diagram illustrating a procedure for switching from the second communication method to the first communication method when a relay antenna is additionally installed between the indoor master unit and the front door slave unit according to a second exemplary embodiment.

FIG. 9 is a sequence diagram illustrating a procedure for switching from the second communication method to the first communication method when a relay antenna is additionally installed between indoor master unit 200 and front door slave unit 100. Here, first, it is assumed that indoor master unit 200 uses the NEM of the second communication method and periodically receives signals.

In step S11, indoor master unit 200 detects additional installation start of a relay antenna, and in step S12, indoor master unit 200 detects additional installation completion of the relay antenna.

In step S13, indoor master unit 200 transmits a communication method switching request, to front door slave unit 100, for switching to the first communication method at a timing where front door slave unit 100 starts, and in step S14, front door slave unit 100 transmits a switching confirmation for the first communication method to indoor master unit 200, and is switched to the first communication method.

Figure 10:
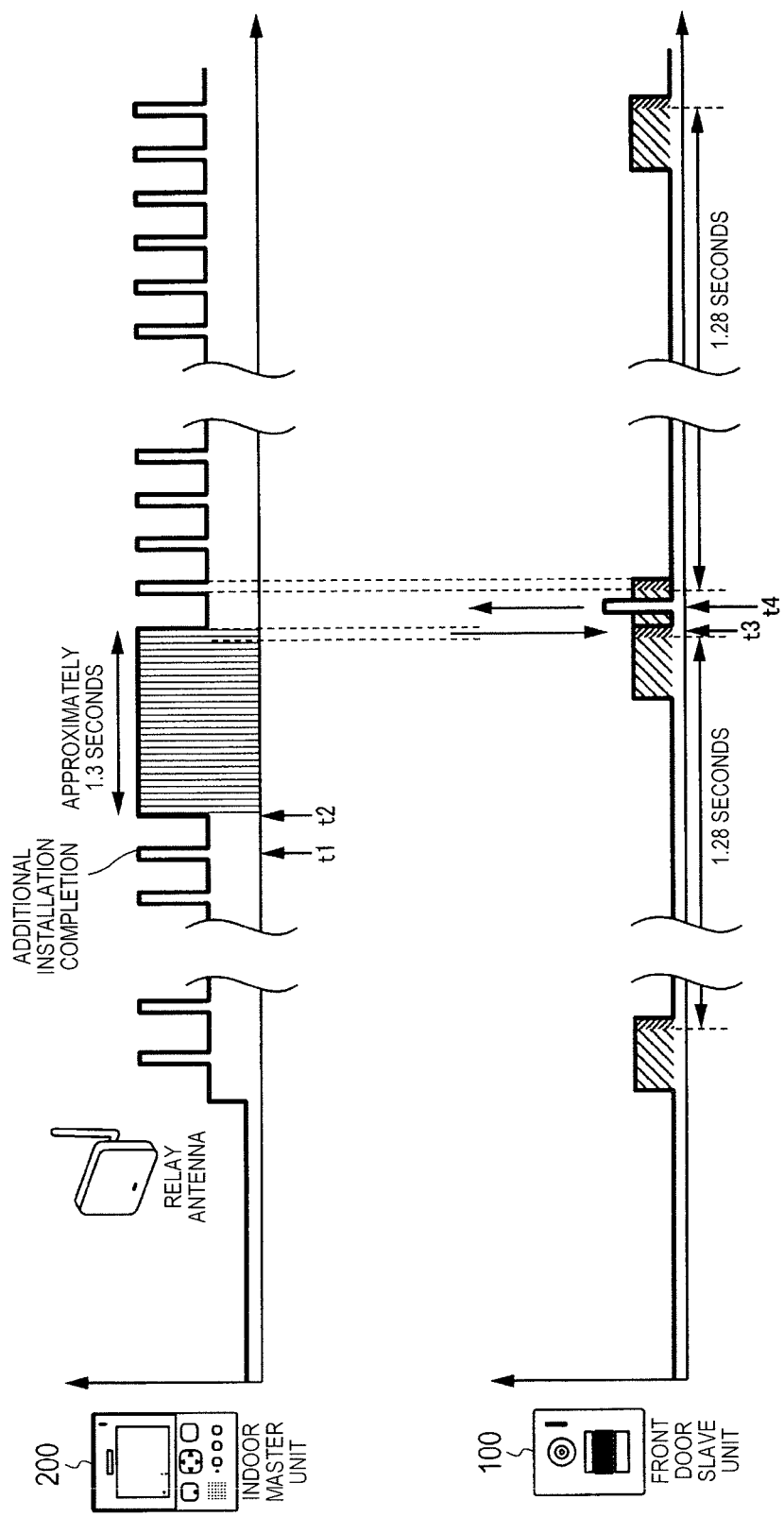
FIG. 10 is a diagram illustrating a state of change of current consumption in the front door slave unit and the indoor master unit.

FIG. 10 is a diagram illustrating a state of change of current consumption in front door slave unit 100 and indoor master unit 200. Indoor master unit 200 transmits a communication method switching request for the first communication method to entire slots at times t2 to t3 (for example, approximately 1.3 seconds longer than 1.28 seconds that is a reception interval of front door slave unit 100. It is possible to surely supplement a reception period of front door slave unit 100 if approximately 1.3 seconds.) when additional installation of the relay antenna is completed at time t1. The communication method switching request that is transmitted from indoor master unit 200 is received in front door slave unit 100 at time t3, front door slave unit 100 transmits a communication method switching confirmation to indoor master unit 200 at time t4, and indoor master unit 200 is switched to the first communication method. In this way, when the relay antenna is additionally installed, switching to the first communication method is caused because the relay antenna is applied to the first communication method and not applied to the second communication method.

In this way, in the video intercom device according to the second exemplary embodiment, it is possible to lengthen a communication distance between front door slave unit 100 and indoor master unit 200 and to improve communication quality using a relay antenna that is applied to the first communication method by being switched from the second communication method to the first communication method when the relay antenna is additionally installed between front door slave unit 100 and indoor master unit 200.

Third Exemplary Embodiment

In a third exemplary embodiment according to the present invention, a case where indoor master unit 200 is removed from a charge unit or connected to the charge unit will be described.

Since a configuration of front door slave unit 100 and indoor master unit 200 according to the third exemplary embodiment is the same as FIGS. 2 and 3 of the first exemplary embodiment, the description is incorporated to these figures, and the overlap will be omitted, if necessary.

Figure 11:
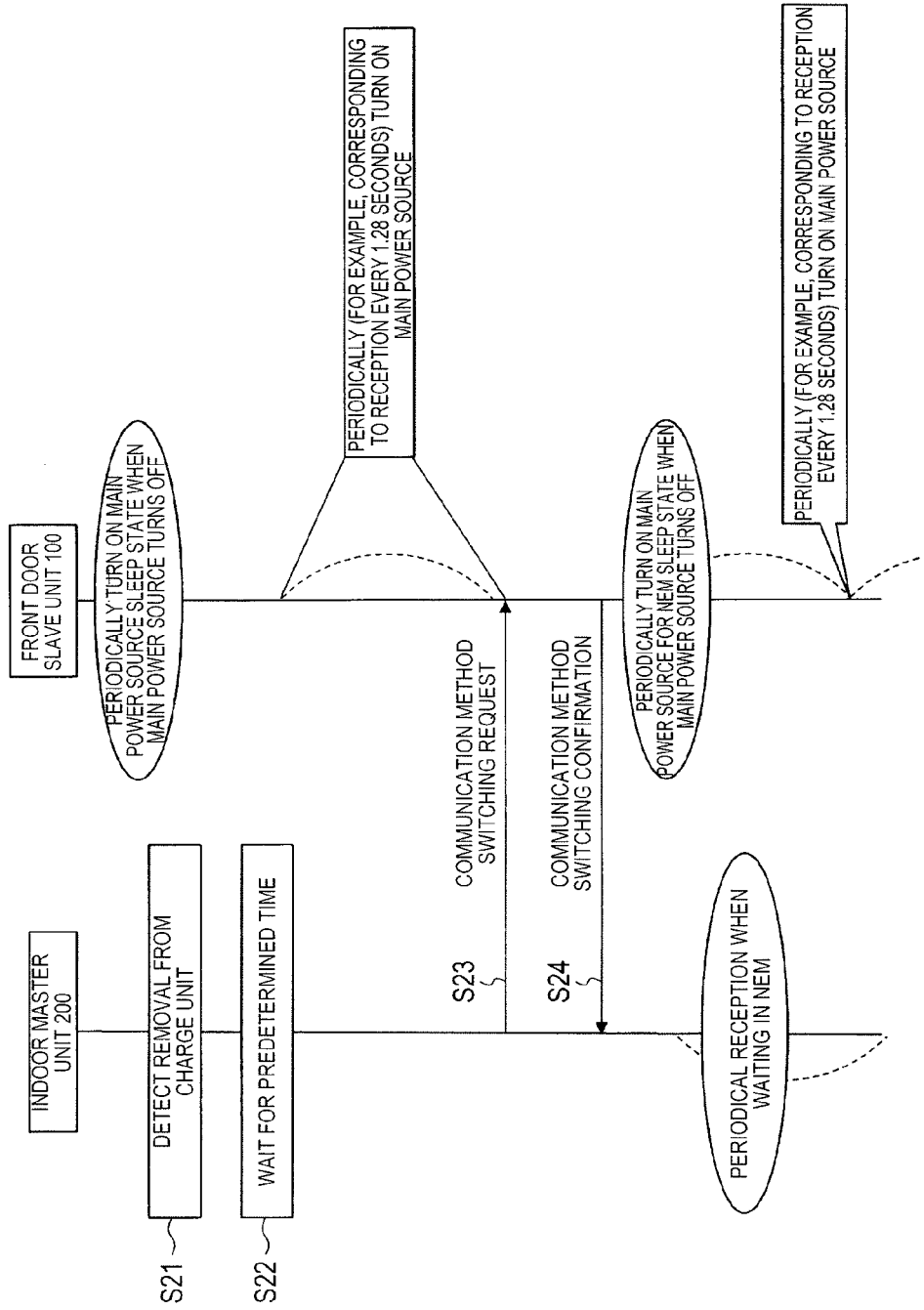
FIG. 11 is a sequence diagram illustrating a procedure for switching from the first communication method to the second communication method when the indoor master unit is removed from a charge unit according to a third exemplary embodiment.

FIG. 11 is a sequence diagram illustrating a procedure for switching from the first communication method to the second communication method when indoor master unit 200 is removed from a charge unit. Here, first, it is assumed that indoor master unit 200 is connected to a charge unit.

In step S21, indoor master unit 200 detects the removal from the charge unit, and in step S22, indoor master unit 200 waits for a predetermined time (for example, 1 minute). This is to exclude a case where indoor master unit 200 immediately returns to the charge unit after indoor master unit 200 is removed from the charge unit.

In step S23, indoor master unit 200 transmits a communication method switching request for switching to the second communication method to front door slave unit 100 at a timing where front door slave unit 100 starts, and in step S24, front door slave unit 100 transmits a switching confirmation for the second communication method to indoor master unit 200 and is switched to the second communication method.

With this, indoor master unit 200 periodically performs reception when waiting, and front door slave unit 100 periodically turns on the main power source for the NEM, and enters the sleep state when the main power source turns off.

Figure 12:
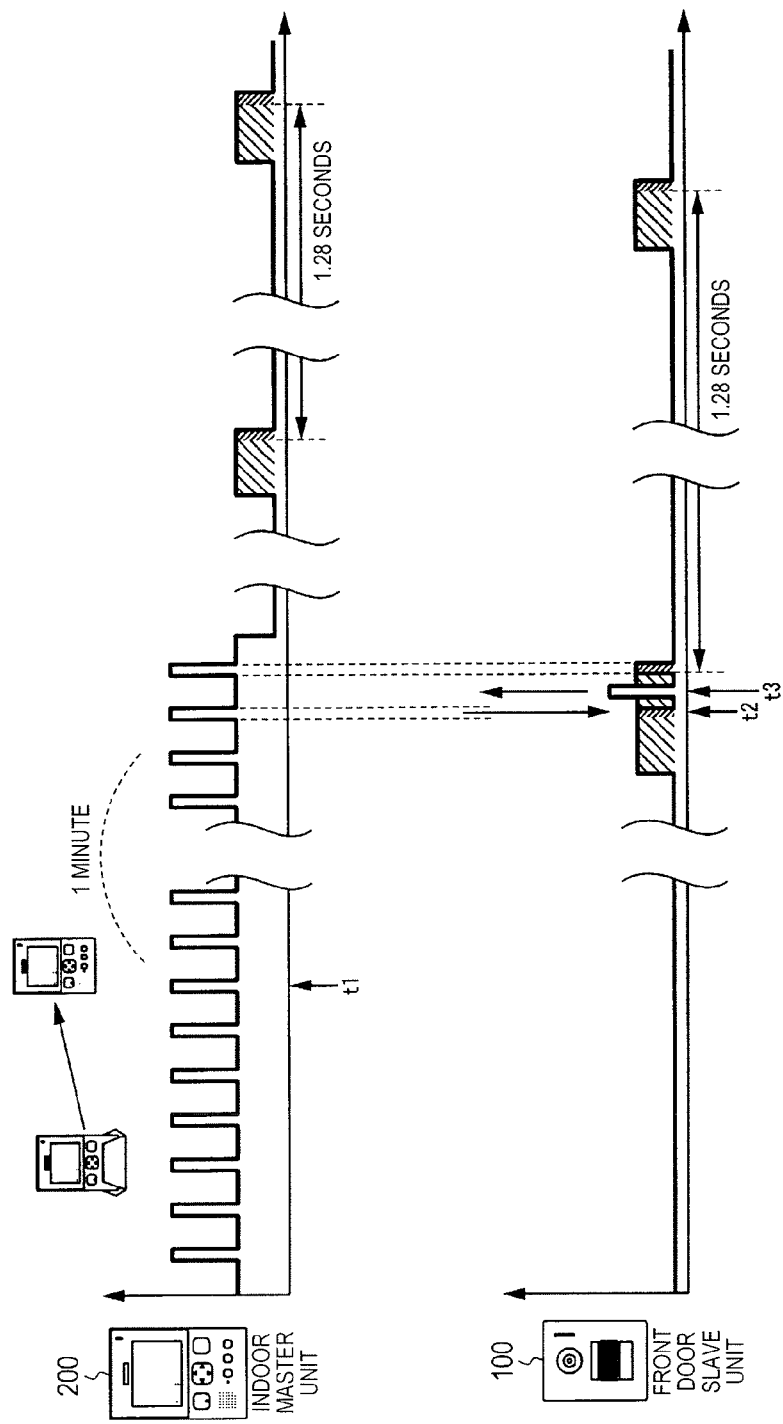
FIG. 12 is a diagram illustrating a state of change of current consumption in the front door slave unit and the indoor master unit.

FIG. 12 is a diagram illustrating a state of change of current consumption in front door slave unit 100 and indoor master unit 200. Indoor master unit 200 waits for 1 minute when indoor master unit 200 has been removed from the charge unit at time t1, and then indoor master unit 200 transmits a switching request for the second communication method at time t2 and front door slave unit 100 receives the switching request.

Front door slave unit 100 transmits a communication method switching confirmation to indoor master unit 200 and is switched to the second communication method at time t3.

In this way, it is possible to suppress electric power consumption of the battery of indoor master unit 200 that is removed from the charge unit and to lengthen a waiting time of indoor master unit 200 by being switched from the first communication method to the second communication method when indoor master unit 200 is removed from the charge unit.

FIG. 13 is a sequence diagram illustrating a procedure for switching from the second communication method to the first communication method when indoor master unit 200 is connected to the charge unit. Here, first, it is assumed that indoor master unit 200 is removed from the charge unit.

In step S31, indoor master unit 200 detects the connection to the charge unit, and in step S32, indoor master unit 200 waits for a predetermined time (for example, 1 minute). This is to exclude a case where indoor master unit 200 is immediately removed from the charge unit after indoor master unit 200 is connected to the charge unit.

In step S33, indoor master unit 200 transmits a communication method switching request for switching to the first communication method to front door slave unit 100 at a timing where front door slave unit 100 starts, and in step S34, front door slave unit 100 transmits a switching confirmation for the first communication method to indoor master unit 200 and is switched to the first communication method.

With this, indoor master unit 200 periodically transmits a synchronous signal every 10 ms at all times and periodically receives signals, and front door slave unit 100 transmits a request by turning on the main power source when necessary, receives the synchronous signal by periodically turning on the main power source, and enters the sleep state when the main power source turns off.

In this way, it is possible to perform stable synchronous communication by which indoor master unit 200 transmits a synchronous signal at a short interval at all times and to favorably maintain communication quality by being switched from the second communication method to the first communication method when indoor master unit 200 is connected to the charge unit.

In this way, in the video intercom device according to the third exemplary embodiment, it is possible to suppress electric power consumption and to lengthen a waiting time of indoor master unit 200 by being switched from the first communication method to the second communication method when indoor master unit 200 is removed from the charge unit. Meanwhile, it is possible to favorably maintain communication quality by being switched from the second communication method to the first communication method when indoor master unit 200 is connected to the charge unit.

Fourth Exemplary Embodiment

In a fourth exemplary embodiment according to the present invention, a case where a communication environment between front door slave unit 100 and indoor master unit 200 is deteriorated or recovered will be described.

Since a configuration of front door slave unit 100 and indoor master unit 200 according to the fourth exemplary embodiment is the same as FIGS. 2 and 3 of the first exemplary embodiment, the description is incorporated to these figures, and the overlap will be omitted, if necessary.

FIG. 14 is a sequence diagram illustrating a procedure for switching from the second communication method to the first communication method when the communication environment between front door slave unit 100 and indoor master unit 200 is deteriorated.

In step S41, indoor master unit 200 detects that RSSI (reception signal strength indicator) is less than a predetermined threshold by being decreased the RSSI, and in step S42, indoor master unit 200 waits for a predetermined time (for example, 1 minute). This is to exclude a case where indoor master unit 200 is immediately recovered from a reception signal strength after the reception signal strength is decreased.

In step S43, indoor master unit 200 transmits a communication method switching request for switching to the first communication method to front door slave unit 100 at a timing where front door slave unit 100 starts, and in step S44, front door slave unit 100 transmits a switching confirmation for the first communication method to indoor master unit 200 and is switched to the first communication method.

With this, indoor master unit 200 periodically transmits a synchronous signal every 10 ms at all times and periodically receives signals, and front door slave unit 100 transmits a request by turning on the main power source when necessary, receives the synchronous signal by periodically turning on the main power source, and enters the sleep state when the main power source turns off.

FIG. 15 is a sequence diagram illustrating a procedure for switching from the first communication method to the second communication method when the communication environment between front door slave unit 100 and indoor master unit 200 is recovered.

In step S51, indoor master unit 200 detects that the reception signal strength is equal to or greater than a predetermined threshold by being recovered the reception signal strength, and in step S52, indoor master unit 200 waits for a predetermined time (for example, 1 minute).

In step S53, indoor master unit 200 transmits a communication method switching request for switching to the second communication method to front door slave unit 100 at a timing where front door slave unit 100 starts, and in step S54, front door slave unit 100 transmits a switching confirmation for the second communication method to indoor master unit 200 and is switched to the second communication method.

With this, indoor master unit 200 transmits a request by turning on the main power source only when necessary, receives signals by periodically turning on the main power source for the NEM when waiting, and enters the sleep state when the main power source turns off. Front door slave unit 100 transmits a request by periodically turning on the main power source for the NEM when necessary, receives signals by periodically turning on the main power source when waiting, and enters the sleep state when the main power source turns off.

In this way, in the video intercom device according to the fourth exemplary embodiment, it is possible to recover a reception signal strength and to preferably maintain communication quality by being switched from the second communication method to the first communication method when the reception signal strength of indoor master unit 200 decreases to less than a predetermined threshold. Meanwhile, it is possible to suppress electric power consumption and to lengthen a waiting time of indoor master unit 200 by being switched from the first communication method to the second communication method when the reception signal strength of indoor master unit 200 recovers to equal to or greater than a predetermined threshold.

In addition, in the present embodiment, a case where communication methods are switched to each other when the reception signal strength decreases or recovers is described. However, the communication method may be switched when the number of available communication slots is less than a prescribed number or equal to or greater than the prescribed number. Here, the number of the available communication slots is, for example, the number of slots where a reception signal strength (that is, signal strength other than communication) of an interference level among the communication slots is equal to or less than a certain threshold. Specific examples include the following example in which communication methods are switched when the number of the available communication slots is less than the prescribed number or equal to or greater than the prescribed number. Switching to the first communication method is performed by determining that there is a lot of interference when the number of available communication slots is less than a prescribed number that is set as a setting value (for example, 2) in advance. Switching to the second communication method is performed by determining that there is less interference when the number of available communication slots is equal to or greater than the prescribed number that is set as the setting value in advance. With this, it is possible to realize a low consumption electric power system corresponding to a wireless interference environment.

The video intercom device according to the present invention is useful for suppressing the electric power consumption.

What is claimed is:

1. A video intercom device, comprising:
    a front door slave unit; and
    an indoor master unit or a telephone master unit that performs wireless communication with the front door slave unit,
    wherein when the front door slave unit is registered in the indoor master unit, the indoor master unit transmits a switching requesting signal for switching to a second communication method with electric power consumption lower than that of a first communication method to the front door slave unit, and is switched from the first communication method by which a synchronous signal is periodically transmitted to the front door slave unit and a signal is periodically received from the front door slave unit, to the second communication method by which a signal is transmitted to the front door slave unit when necessary and a signal is periodically received from the front door slave unit when waiting,
    wherein when the switching requesting signal is received, the front door slave unit is switched from the first communication method by which a signal is transmitted to the indoor master unit when necessary and the synchronous signal is received from the indoor master unit by periodically turning on a main power source when waiting, to the second communication method by which a signal is transmitted to the indoor master unit when necessary and a signal is received from the indoor master unit by periodically turning on the main power source when waiting,
    wherein the indoor master unit includes a reception signal strength detector that detects strength of a signal received from the front door slave unit, and requests for switching from the second communication method to the first communication method to the front door slave unit when the reception signal strength detector detects that the strength is less than a predetermined threshold, and
    wherein the indoor master unit requests for switching from the first communication method to the second communication method to the front door slave unit when the reception signal strength detector detects that the strength is equal to or greater than a predetermined threshold.

2. The video intercom device of claim 1,
    wherein when the front door slave unit is registered in the telephone master unit, the telephone master unit transmits a switching requesting signal for switching from the second communication method to the first communication method to the front door slave unit, and is switched from the second communication method to the first communication method, and
    wherein when the switching requesting signal is received, the front door slave unit is switched from the second communication method to the first communication method.

3. The video intercom device of claim 1,
    wherein the indoor master unit includes a charge detector that detects whether or not the indoor master unit is connected to a charge unit, and requests for switching from the second communication method to the first communication method to the front door slave unit when the charge detector detects that the indoor master unit is connected to the charge unit.

4. The video intercom device of claim 3, wherein the indoor master unit requests for switching from the first communication method to the second communication method to the front door slave unit when the charge detector detects that the indoor master unit is removed from the charge unit.

5. The video intercom device of claim 1, wherein the indoor master unit includes a reception signal strength detector that detects strength of a signal received from the front door slave unit, and requests for switching from the second communication method to the first communication method to the front door slave unit when the reception signal strength detector detects that the number of available communication slots is less than a prescribed number.

6. The video intercom device of claim 5, wherein the indoor master unit requests for switching from the first communication method to the second communication method to the front door slave unit when the reception signal strength detector detects that the number of available communication slots is equal to or greater than a prescribed number.

7. The video intercom device of claim 1, wherein the indoor master unit transmits a signal to the front door slave unit by turning on the main power source only when necessary, in the second communication method.

8. The video intercom device of claim 7, wherein the indoor master unit receives a signal from the front door slave unit by periodically turning on the main power source when waiting, and enters a sleep state when the main power source turns off, in the second communication method.

9. The video intercom device of claim 1, wherein the front door slave unit transmits a signal to the indoor master unit by turning on the main power source only when necessary, and enters the sleep state when the main power source turns off, in the first and second communication methods.

10. The video intercom device of claim 1, wherein in the second communication method, the indoor master unit becomes a no emission mode (NEM) in which a synchronous signal and all other signals are not transmitted when waiting.

11. The video intercom device of claim 1, wherein the indoor master unit transmits a switching requesting signal for switching from the second communication method to the first communication method to the front door slave unit when detecting that a relay antenna is additionally installed between the front door slave unit and the indoor master unit, and wherein the front door slave unit is switched to a communication method requested from the indoor master unit when the switching requesting signal is received.

12. A video intercom device, comprising:
a front door slave unit; and
an indoor master unit or a telephone master unit that performs wireless communication with the front door slave unit,
wherein when the front door slave unit is registered in the indoor master unit, the indoor master unit transmits a switching requesting signal for switching to a second communication method with electric power consumption lower than that of a first communication method to the front door slave unit, and is switched from the first communication method by which a synchronous signal is periodically transmitted to the front door slave unit and a signal is periodically received from the front door slave unit, to the second communication method by which a signal is transmitted to the front door slave unit when necessary and a signal is periodically received from the front door slave unit when waiting, wherein when the switching requesting signal is received, the front door slave unit is switched from the first communication method by which a signal is transmitted to the indoor master unit when necessary and the synchronous signal is received from the indoor master unit by periodically turning on a main power source when waiting, to the second communication method by which a signal is transmitted to the indoor master unit when necessary and a signal is received from the indoor master unit by periodically turning on the main power source when waiting,
wherein, in the second communication method, the indoor master unit transmits a synchronous signal with an interval longer than a reception interval of the front door slave unit to the front door slave unit, and
wherein the front door slave unit receives the synchronous signal with the interval longer than the reception internal of the front door slave unit by periodically turning on the main power source, and enters the sleep state when the main power source turns off.

* * * * *